Aug. 23, 1938.  LE GRAND S. WHEDON  2,127,795
CONVERTIBLE VEHICLE STRUCTURE
Filed July 27, 1936  3 Sheets-Sheet 3
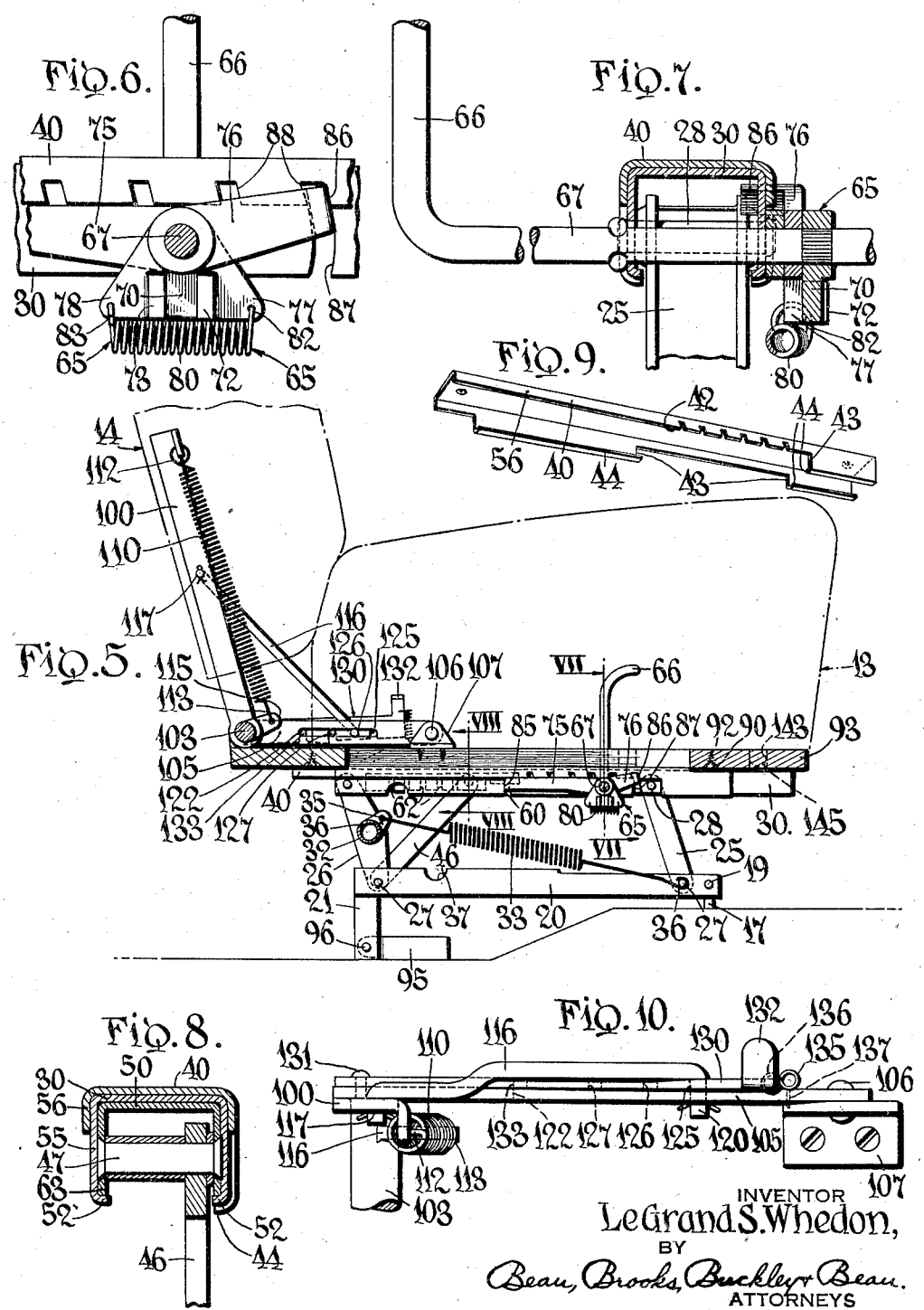
INVENTOR
LeGrand S. Whedon,
BY
Bean, Brooks, Buckley & Bean.
ATTORNEYS Patented Aug. 23, 1938

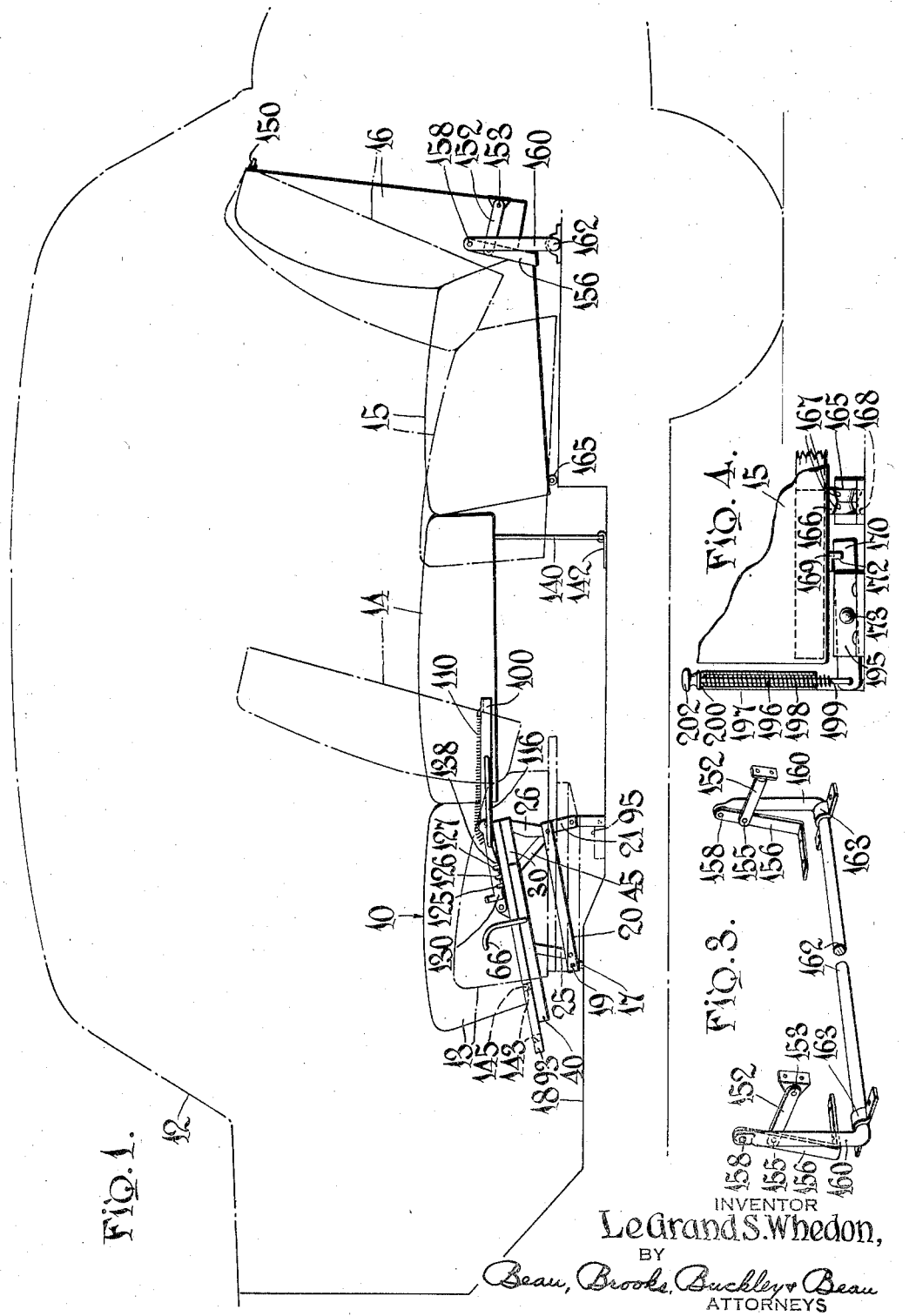

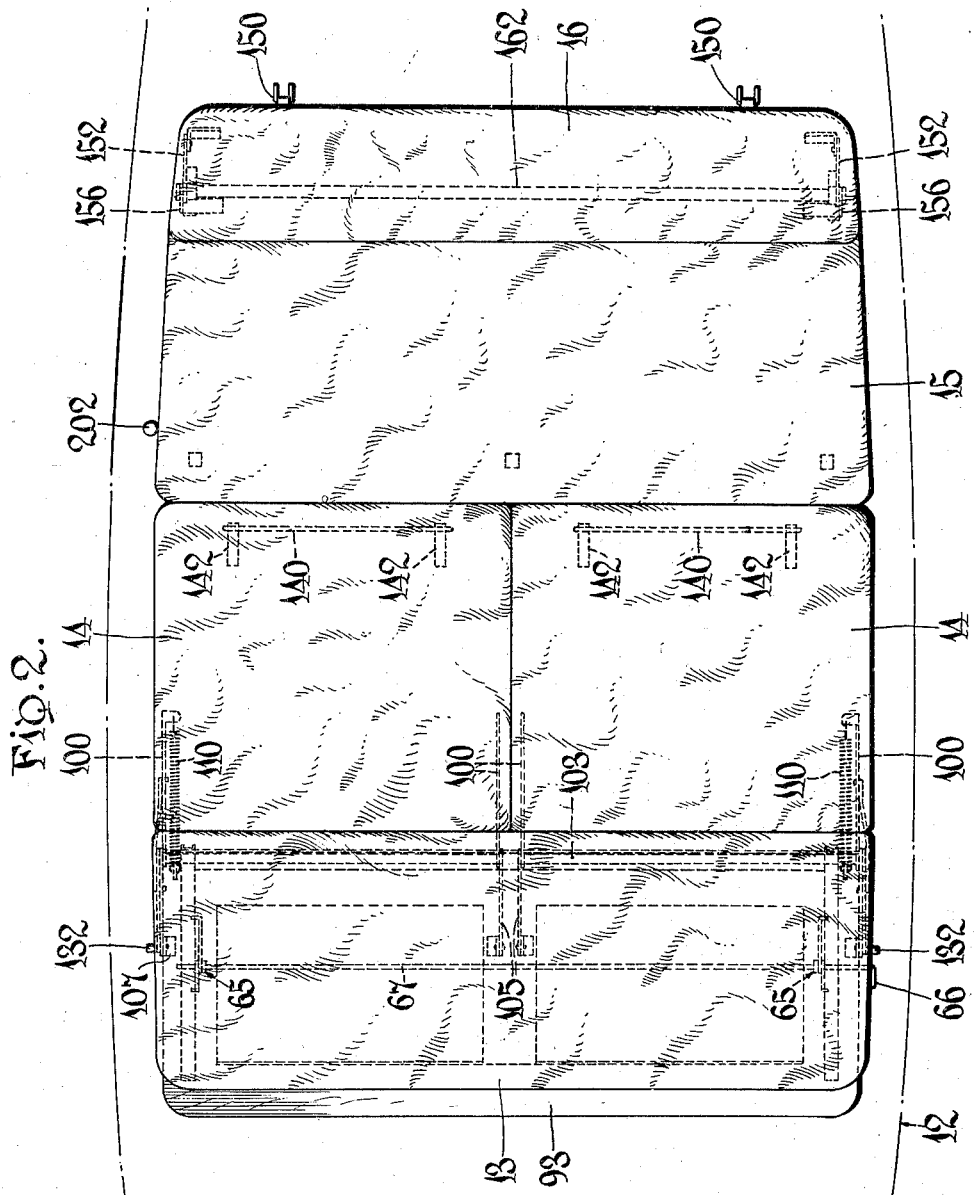

2,127,795

UNITED STATES PATENT OFFICE 2,127,795

CONVERTIBLE VEHICLE STRUCTURE

Le Grand S. Whedon, Medina, N. Y.

Application July 27, 1936, Serial No. 92,738

5 Claims. (Cl. 155—7)

This invention relates to convertible seat and bed structure and it has particular relation to a bed or couch arrangement adapted to be converted into front and rear seats for a vehicle.

One object of the invention is to provide an improved combination of couch sections which are suitable to serve as comfortable sleeping quarters and, at the same time, are movable into various relatively adjusted positions for comfortable seating of vehicle passengers in various positions in or outside the normal plane of the couch.

Another object of the invention is to provide a couch structure having front and rear sections adjustable to provide a substantially level couch, and such front and rear sections being convertible into front seat bottom and back structure adjustable as a unit as well as being adjustable relative to rear sections which are convertible into or constitute rear seat bottom and back structure.

The features of the invention are adapted to be incorporated in any type of vehicle in which front and rear seats are ordinarily provided. The front sections of the couch that are adapted to be converted into or serve as seat back and bottom structure are mounted upon adjusting arrangement which provides for locking these sections of various levels, and, at the same time, provides for forward and rearward adjustment of the section while disposed at any of the levels referred to. Additional provision is made for tilting the front sections so as to insure proper inclination of the portion which serves as a seat bottom. When used as a part of a bed or couch, this section is substantially horizontal and when it is used as a seat bottom its upper surface is so positioned as to be inclined rearwardly from its front. Two independently pivotable and adjustable front seat-back portions are provided.

The rear portion of the couch structure has a section in the form of a seat bottom carried in movable relation and with properly supported swinging arms to provide for changing the inclination of the upper surface of this seat bottom, which is movable to various positions forwardly and rearwardly.

In assembling the parts of the couch structure, the rear section or seat bottom is actuated rearwardly, and the front section is moved to proper level with respect thereto. Then the front portions which constitute the seat-back sections are pivoted rearwardly to horizontal position and rest upon supports in the form of pivotal members connected to the floor of the vehicle. The front structure, including the seat bottom and back sections are then moved horizontally to abut closely the front edge of the rear section. A seat cushion installed on the front seat bottom is removable and is adapted to be positioned in abutting relation against the front edge of the horizontally disposed seat-back, or this cushion can remain in its original position upon the seat bottom for making the bed longer. The adjustable features of the arrangement are very simple in operation and the couch can be converted into front and rear seating structure with only slight delay, or conversely, when the structure is arranged for seating purposes, it can be converted into a couch within a few moments.

In the drawings:

Fig. 1 is a side elevation of a convertible couch and seating structure as applied to a vehicle, and including the principal features of the invention;

Fig. 2 is a plan of the convertible couch and seat structure shown in Fig. 1.

Fig. 3 is a perspective of suspension mechanism for supporting the rear portion of a seat structure;

Fig. 4 is a fragmentary front elevation of a seat latching and guiding devices;

Fig. 5 is a side view partially in elevation and partially in section illustrating features of the invention incorporated in front seating structure of a vehicle;

Fig. 6 is a fragmentary side elevation, on a larger scale, of a locking mechanism included in the invention;

Fig. 7 is a cross section, on a larger scale, taken substantially along the line VII—VII of Fig. 5;

Fig. 8 is a cross section, on a larger scale, taken substantially along the line VIII—VIII of Fig. 5;

Fig. 9 is a perspective of a slide member for guiding movement of a portion of seat structure; and Fig. 10 is a plan of seat back adjusting and locking mechanism.

In practicing the invention according to one embodiment thereof, a couch or bed 10 is installed in a vehicle 12, and includes front seat sections 13 and 14 constituting a front seat bottom and seat back unit, which is arranged for coordination with rear seat sections 15 and 16 constituting a rear seat back and seat bottom unit. It will be noted the front seat-back structure is divided into two sections 14 (Fig. 2).

Adjacent each side of the couch, a support 17 in the vehicle floor 18 pivotally supports, as indicated at 19, an upwardly opening lower channel frame member 20 that has a rear downwardly projecting extension 21 resting normally upon the floor of the vehicle. The sections 13 and 14 can be tilted as a unit about the pivotal connections 19.

Front links 25 and rear links 26 of channel form disposed at opposite sides of the front seat bottom 13 have pivotal connections 27, such as bolts or pins, securing them to the lower channel members 20, and have upper pivotal connections 28 securing them between the sides of downwardly opening channel members 30. A rigid brace 32 rigidly connecting the rear links 26 has its opposite end portions extending through adjacent channel sides of opposite links 26 and is rigidly secured to each of these links. The brace is rigidly secured to the links by means of welding or the like.

One end of a tension spring 33 is provided with an end connection 35 in the form of an ear rigidly formed upon the transverse brace 32 adjacent each end of the latter, and the other end of this spring is connected to a front portion of the adjacent lower channel member 20 by means of one of the pins 27. The spring 33 is normally under tension and resists movement of the links from a substantially upright position toward a horizontal position; that is, the springs constantly urge the links toward an upright position.

One side of each of the upper and lower channel members 20, 30 is provided with a recess 37 into which the transverse brace 32 partially enters to permit unobstructed movement of the links within their normal limits of operation.

Sliding channel members 40 at opposite sides of the seat bottom 13 open downwardly and partially embrace the sides of the channel members 30. Portions of the sides of the channel members are cut away or narrowed, as indicated at 42, to provide for free sliding action of the channel members 40 upon the channel members 30 within predetermined limits, and to provide stops 43, which are adapted to engage in abutting relation the upper pivotal connections 28 for limiting movement of each channel member 40 upon the channel member 30. Also, portions of the sliding channel members 40 are provided with inwardly turned flanges 44 which underlap the lower edges of the channel members 30 to prevent separation of these members 30 and 40. However, there is sufficient channel side for slidable engagement from end to end of each sliding channel member with the vertical sides of the channel members 30.

An adjusting link 46 is pivotally secured at its lower end by means of one of the pivotal connections 27 that carries one of the rear links 26 upon the lower supporting channel member 20 at each side of the seat bottom 13, and the upper end of the adjusting link 46 is secured by means of a pivot pin 47 (Fig. 8) in a downwardly opening adjusting channel slide 50 which is slidably guided longitudinally in the upper channel member 30 between the pivotal connections 28 and is maintained against downward displacement by means of inwardly turned flanges 52 formed upon the lower side portions of the channel member 30. These flanges 52 are similar in structure and function to the flanges 44.

An inner channel member side 55 contiguous with a side 56 of the channel slide 40 has a notch or slot 60 (Fig. 5) cut therein through its lower edge, and the adjusting slide 50 has a series of notches or slots 62 formed in one of its depending sides 63. Any one of the notches 62 is registerable with the notch 60, depending upon the position of the adjusting slide 50 in each channel member 30.

A locking device 65 is provided for each channel member 40 and for the locking slide 50, and includes an actuating lever 66 forming a rigid extension of a horizontal shaft section 67. The latter section extends between the two channel members 30 and is rotatably mounted transversely thereof in the downwardly extending sides of these channel members.

A lug 70 extending rigidly and radially from the shaft section 67 adjacent each channel member 30, is disposed between a pair of lugs 72 and 73 formed rigidly upon inner end portions of latches 75 and 76, respectively, that are rotatably mounted upon the horizontal shaft section 67 between the inner side of the channel member 30 and the lug 70. End portions 77 and 78 of the latches adjacent the lugs 72 and 73, respectively, are spaced on opposite sides of the group of lugs 70, 72 and 73, and it should be understood that all of these lugs and end portions extend outwardly from the axis of the horizontal shaft portion 67. Opposite end portions of a tension spring 80 are secured, as indicated at 82 and 83, to the latch end portions 77 and 78, respectively, and this spring which is normally under tension, constantly tends to pivot the latches in opposite directions, or, as viewed in Figs. 5 and 6, the outer ends of the latches are constantly urged upwardly.

An angular finger 85 formed rigidly upon the outer end of the latch 75 is movable into or out of the notch 60 and into a registering notch 62 of the adjusting slide 50 to lock the latter in various positions in the channel member 30, whereby the links 25, 26, together with the channel members 30 can be locked in various positions between the full line position and broken line position of the structure shown in Fig. 1. By rocking the lever 66 in a counterclockwise direction, as viewed in Fig. 5, the lug 70 engages the lug 72 and pivots the latch 75 to withdraw the finger 85 from the notches 60, 62. Upon releasing the lever 66 the spring 80 forces the latch 75 in the opposite direction into locking relation with the notches, 60, 62.

The outer end of the other latch 76 is provided with a locking finger 86 which is disposed in a notch or slot 87 formed in the inner side of each channel member 30 and is movable therein to engage in any of a series of notches 88 formed in the lower edge of the depending side 56 of each downwardly opening sliding channel member 40 which partially embraces the upper channel 30 adjacent the side of the seat structure.

By rocking the lever 66 in a clockwise direction (Fig. 5) the lug 70 strikes the lug 73 and pivots the latch 76 to withdraw the finger 86 from the registering notches 87 and 88. As soon as the lever 66 is released the spring 80 pivots the latch into engaging relation with these notches. Each latch 75, 76 is independently pivotable. As the lug 70 moves the lug 72 to pivot the latch 75, the lug 73 remains stationary, and the tension of the spring 80 is increased to urge the finger 86 more firmly into its locking relation. In the same manner, the lug 72 remains stationary while the lug 70 actuates the lug 73.

It should be understood that the portions of the downwardly extending sides of the channel members 40 in which the notches 88 are formed have their lower edges terminating short of, or substantially coincidental with, the upper ends of the notches 60 and 62, in order that there can be no possibility of the finger 85 accidentally engaging in any of the notches 88.

The upper opposite end portions of the sliding channel members 40 are provided with outwardly stamped recessed bosses 90 through which fastening devices 92, such as screws or bolts, are rigidly secured to a frame 93 of the seat bottom section 13 to complete the assembly of the channel members in the front seat installation.

Each of the lower channel members 20 is provided adjacent its rear end with a pivotal foot 95 having a pivotal connection 96 securing it to the rigid angular extension 21 of each channel member 20 and is adjustable to the position shown in full lines of Fig. 1, that is, to an upright position, for the purpose of providing a support for the channel members, and seat construction carried thereon, in tilted position. This arrangement is designed for the purpose of leveling the seat bottom 13 for converting it into a part of a couch.

Each seat back section 14 of the double front seat-back structure is provided with substantially parallel side frame members 100 that are pivotally connected adjacent their inner or lower ends by means of a transverse brace 103, and these frame members are rigidly anchored in the structure of each front seat-back section 14. The outer end portion of each brace 103 is rigidly connected to one end of an arm 105, the other end of which is provided with a pivotal connection 106 securing it to a bracket 107 that is rigidly mounted upon the seat bottom frame 93 at a location intermediate the front and rear extremities of the seat-bottom.

One end of one or more coil springs 110 normally under tension, is connected, as indicated at 112, to the upper portion of at least one of the frame members 100 of each seat back section 14, and the other spring end is connected, as indicated at 113, to an arm 115 rigidly carried upon the transverse brace 103. An adjusting link 116 is pivoted, as indicated at 117, to one of the frame members 100 at each side of the seat structure, and the other end portion of the link is provided with an angular finger 120 which is slidably disposed in a slot 122 formed longitudinally in the arm 105. A series of notches 125, 126 and 127 formed in the lower edge portion of a locking lever 130 are selectively engageable with the finger 120, and an end portion of the lever 130 is pivoted to the arm 105 adjacent the outer sides of the seat back sections 14, by means of suitable pivotal connections 131 that is disposed adjacent the brace 103. Thus rearward pivotal movement of each back 14 increases tension on the spring 110.

An outer end portion of the adjusting lever 130 is provided with an angular extension to form an operating handle or finger piece 132 that is accessible at the side of the seat bottom section 14 on each side of the latter. An additional notch 133 formed in the adjusting lever 130 is spaced rearwardly from the series of notches 125, 126 and 127, but not beyond the end of the slot 122, and is adapted to be engaged in locking relation by the finger 120 of the locking link 116. A coil spring 135 (Figs. 5 and 10) has one end portion connected, as indicated at 136, to an outer end portion of the lever 130, that is, the end of the latter remote from its pivotal connection 131, and the other end of the spring is connected, as indicated at 137, to a relatively stationary portion of the seat bottom frame 14.

From this description it will be apparent that each seat back section 14 is pivotable about the connections 106 while the link 116 maintains the frame members 100 and the arms 105 in rigid relation. Thus the back sections 14 can be moved forwardly about the pivots 106 to facilitate entry of passengers to the rear seats of the vehicle. In addition to this advantage, the adjusting finger 120 of the link 116 can be engaged with any of the notches 125, 126 or 127 after the lever 130 has been pivoted upwardly against the tensional resistance of the spring 135 and the seat back sections 14 can then be adjusted in tilting relation backwardly or forwardly about the axis of the rod 103 as each arm 105 lies upon the rear upper surface of the frame 93. This action provides for materially varying the effective depth of the seating structure.

It is to be understood that the lower portions of the seat back sections 14 normally rest upon the seat bottom frame although the actual connection to this frame is provided by the front pivotal connections 106 of the arms 105 adjacent the intermediate portion of the seat bottom.

When it is desired to move the finger 120 from one of the notches 125, 126 or 127 to the rearmost notch 133, the lever 130 must be pivoted upwardly sufficient distance to insure clearance of an offset corner 138 from the path of the finger in the slot 122, and the tensional extension of the spring 135 to release the finger 120 from one of these notches over the corner 138 is greater than the spring extension required to release the finger 120 for rearward movement from the front notch 125 to an adjacent notch 126 or 127. This condition obtains because of the position of the projecting corner 138 and, to a certain extent, to the difference in length of radii drawn from the pivotal connection 131 to the notch 127 and to the front notch 125, respectively. Hence, when the finger 120 is disposed in the notch 127, the operator is apprised of this fact upon actuating the lever 130 because the latter must pivot through a greater angle, and since the spring must be extended a greater degree to provide clearance for the corner 138 it offers more resistance than that required in actuating the lever to release the finger from the front notch 125.

When it is desired to adjust the seat back sections 14 to the position shown in full lines of Fig. 1, the lever 130 is pivoted upwardly to release the locking finger 120 and the seat back section 14 is moved rearwardly until the finger 120 engages the notch 133 and is locked therein. Before actuating the seat back sections to this position, frame-like supports 140 are pivoted to an upright position about their pivotal connections 142 that secure them to the floor 18 of the vehicle. These supports 140 can be obscured under conventional floor mat or mats which can be folded back when it is desired to use the supports in their upright position.

After the seat back sections 14 have been moved to substantially horizontal position as shown in the full lines of Fig. 1, the front seat bottom section 13 can be shifted rearwardly until the rear edge thereof abuts the front edge of the seat back section 14. This adjustment (Figs. 1 and 5) is effected by means of openings 143 formed in the frame 93 and in which downwardly extending lugs or projections 145 are selectively engageable to hold the seat bottom against accidental forward or rearward displacement. If longer substantially horizontal extent is desired for the combined sections 13 and 14, the projections 145 are disposed in the front openings 143, (Fig. 5) and remains so positioned after the seat back sections have been moved to their substantially horizontal position.

The upper portion of the rear seat back section is provided with pivotal supports 150 carried in the vehicle frame structure at the rear of the vehicle. Substantially horizontally disposed links 152 have end portions pivotally secured, as indicated at 153, to opposite sides of the seat back section, and the other end portions of these links (Figs. 1 and 3) are pivotally secured, as indicated at 155, to upwardly extending stirrups 156 that are rigidly secured at their lower ends to the rear of the seat bottom section 15. Upper ends of the stirrups 156 are provided with pivotal connections 158 securing them to the upper ends of arms 160 which are rigid with opposite ends of a transverse rocker shaft 162. The arms 160 and shaft 162 constitute a substantially inherently rigid U-shaped structure. Opposite end portions of the transverse rocker shaft 162 are mounted in bearings 163 carried rigidly upon the frame structure of the vehicle.

Rollers 165 which are rotatably supported upon the floor of the vehicle adjacent the front portions of the seat-bottom section 15 provide for forward and rearward guiding of the seat bottom section. If desired, seat supporting rails 166 secured to the bottom of the seat bottom 15 can be formed with a V-shaped lower surface 167 and the rollers 165 can be so formed as present a surface 168 corresponding to the V-shaped rail for operation thereon. This arrangement prevents lateral shifting of the front portion of the seat bottom section.

In order to maintain the seat bottom and back sections 15 and 16 in various positions of relative adjustment, a rack bar 169 of angle form is rigidly secured to the lower portion of the seat bottom section and a latch 170 having one end movable into engagement with rack teeth 172 of the bar is pivoted, as indicated at 173, intermediate its ends upon a bracket 195 that is bolted to the vehicle frame. An upright rod 196, pivotally connected to the outer end of the latch 170, extends through a guide 197 that is rigidly secured to the vehicle frame, and a coil compression spring 198 surrounds the rod 196. One end of the coil spring is secured, as indicated at 199, to the rod 196, and its other or upper end extends toward, for contact with, an upper offset portion 200 of the guide.

In order to move the inner end of the latch 170 into and out of engagement with the rack bar 169, a handle or finger piece 202 on the upper end of the rod 196 is manipulated in the proper direction; that is, it is drawn upwardly. On the other hand, the compression spring normally maintains the latch in engagement with a rack bar by urging it in a clockwise direction, as viewed in Fig. 4, about the pivotal connection 173.

When it is desired to convert the structure described from seat arrangements into couch arrangement, the front seating unit 13—14 and the rear seating unit 15—16, which clearly constitute front and rear sectional structures, or can as truly be referred to as two sections, one at the front and one at the rear are adjusted in such manner as to provide a substantially continuous and horizontal upper couch surface. In adjusting the parts, the members 202, 170 are actuated to release the rear seating unit for movement on the arms 160 and rollers 165. In normal seating position, the upper surface of rear seat bottom 15 is inclined upwardly from its back, as indicated in broken lines of Fig. 1. Vehicle seats are positioned in conventional practice in such manner as to have upwardly and forwardly inclined seating surfaces. However, in adjusting the rear unit 15—16 to the full line position of Fig. 1, the seat bottom 15 assumes such position as to present a substantially horizontal upper surface and is also moved rearwardly a considerable distance which provides for increased couch length.

After the rear unit 15—16 has been adjusted as described, the front unit 13—14 is first pivoted about the pivotal connection 19 and the extension or foot 95 is placed in an upright position as shown in the full lines of Fig. 1. This manipulation is for the purpose of altering the inclination of the unit 13—14 or leveling the upper surface of the seat bottom 13, which normally under passenger seating and driving conditions is inclined upwardly and forwardly from its rear portion. By operating the lever 130 to release the seat back section 14, the latter can be pivoted rearwardly to the position shown in full lines of Fig. 1. In this position, the supports 140 will have been moved to raised or upright position to carry the outer end portion of each section 14. The length of each support 140 is such that the outer end of each section 14 resting thereon is horizontally disposed and is substantially evenly level with the front portion of the rear seat bottom 15 after the latter has been adjusted to substantially horizontal position. The leveling and elevation of the seat bottom 13 can also be additionally refined by adjustment of the link arms 25, 26 in connection with the adjusting device 65 in the manner described previously. Since the channel members 40 and 93 are relatively slidable and selectively adjustable by manipulation of the device 65, the outer end of the seat back 14 of the front unit can be abutted directly and closely against the front end of the rear seat bottom 15.

In order that the seat bottom 13 may be abutted against the front edge of the seat back 14 while the latter is horizontal, proper adjustment can be achieved by lifting the seat bottom 13 and anchoring the projections 145 thereon in the proper openings 143 of the seat bottom frame. In combining these various features of adjustment, a substantially unbroken horizontal closely fitting relationship is established among the upper surfaces of the sections 13, 14 and 15. On the other hand, when the parts described are converted into passenger seating relation, they assume positions best adapted for riding comfort of the passengers carried thereby.

From the foregoing description it will be apparent that the arrangement of the structure is such that the most satisfactory couch installation can be effected without in anywise interfering with the efficiency and proper positioning of the seating elements when the structure is used for seating purposes. The several seating parts need not be specially designed or positioned in order to be adjusted to fit in proper couch forming association bcause the several adjustments serve for such movements as to bring all of the parts into their proper relation either as a seat or couch installation with minimum inconvenience. The installation can be converted into either of the forms described at a moment's notice and while the operator is seated in the vehicle.

Although only one form of the invention has been shown and described in detail, it will be apparent to those skilled in the art that the invention is not so limited, but that various changes can be made therein without departing from the spirit of the invention or from the scope of the appended claims.

I claim:

1. In a vehicle body, a convertible bed structure including two units adapted to be converted into seats, members connected to one unit and supporting the latter in said body for forward and rearward movement therein, means carried in the vehicle body and having connections to the other unit for bodily altering the elevation of the latter unit, mechanism connected to said other unit for guiding the latter substantially horizontally upon said means toward and away from said one unit independently of the elevating action, said other unit having a normally upright portion pivotable thereon and provided with means for adjusting the upright portion to a substantially horizontal position, whereby said units can be abutted against each other and levelled along a substantially common horizontal plane.

2. In a vehicle body, a convertible bed structure including two units adapted to be converted into seats, members connected to one unit and supporting the latter in said body for forward and rearward movement therein, means carried in the vehicle body and having connections to the other unit for bodily altering the elevation of the latter unit, mechanism connected to said means and to said other unit for guiding the latter substantially horizontally upon said means toward and away from said one unit independently of the elevating action, said other unit having a normally upright portion pivotable thereon and provided with means for adjusting the upright portion to a substantially horizontal position, whereby said units can be abutted against each other and leveled along a substantially common horizontal plane, and devices connected to said means and supported in the vehicle for altering the inclination of said other unit.

3. In a vehicle body, a convertible bed structure including two units adapted to be converted into seats, members connected to one unit and supporting the latter in said body for forward and rearward movement therein, means carried in the vehicle body and having connections to the other unit for bodily altering the elevation of the latter unit, mechanism connected to said means and to said other unit for guiding the latter substantially horizontally upon said means toward and away from said one unit independently of the elevating action, said other unit having a plurality of normally upright portions and having means for independently adjusting the upright portions to a substantially horizontal position, whereby said units can be abutted against each other and levelled along a substantially common horizontal plane.

4. In a vehicle body, a convertible bed structure including two units adapted to be converted into seats, members connected to one unit and supporting the latter in said body for forward and rearward movement therein, means carried in the vehicle body and having connections to the other unit for bodily altering the elevation of the latter unit, mechanism connected to said means and to said other unit for guiding the latter substantially horizontally upon said means toward and away from said one unit independently of the elevating action, said other unit having a normally upright portion pivotable thereon and provided with means for adjusting the upright portion to a substantially horizontal position, whereby said units can be abutted against each other and levelled along a substantially common horizontal plane, said second unit having a removable cushion and having means for selectively anchoring the cushion in abutting and non-abutting relation to said portion.

5. In a vehicle body, a convertible passenger carrying structure including two units adapted to be converted selectively into a bed or seats, each unit including a seat bottom normally inclined upwardly and forwardly from their rear edges, members connecting one unit to said body and movable to carry said one unit from a position of inclination of its seat bottom to a position levelling the latter seat bottom, means carried in the vehicle body and having connections to the other unit for bodily altering the elevation of the latter unit, mechanism connected to said means and to said other unit for guiding the latter upon said means toward and away guiding the latter substantially horizontally upon said means toward and away from said one unit independently of the elevating action, said other unit having a normally upright portion pivotable thereon and provided with means for adjusting the upright portion to a substantially horizontal position, whereby said units can be abutted against each other and levelled along a substantially horizontal plane, and members supported by said body and connected to said means to adjust the seat bottom of said other unit from an inclined position to a substantially horizontal position.

LE GRAND S. WHEDON.